US011837075B2

(12) United States Patent
Poder et al.

(10) Patent No.: US 11,837,075 B2
(45) Date of Patent: Dec. 5, 2023

(54) PROCESSING ALARM SIGNALS

(71) Applicant: Comcast Cable Communications, LLC, Philadelphia, PA (US)

(72) Inventors: James Poder, Carlsbad, CA (US); Bill Horrocks, Media, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/151,562

(22) Filed: Jan. 9, 2023

(65) Prior Publication Data

US 2023/0237898 A1 Jul. 27, 2023

Related U.S. Application Data

(63) Continuation of application No. 17/171,707, filed on Feb. 9, 2021, now Pat. No. 11,580,847, which is a continuation of application No. 16/281,596, filed on Feb. 21, 2019, now Pat. No. 10,950,120, which is a continuation of application No. 15/658,720, filed on Jul. 25, 2017, now Pat. No. 10,262,526, which is a continuation of application No. 14/687,122, filed on Apr. 15, 2015, now Pat. No. 9,754,477, which is a continuation of application No. 13/826,489, filed on Mar. 14, 2013, now Pat. No. 9,035,763.

(51) Int. Cl.
*G08B 29/18* (2006.01)
*H04W 4/029* (2018.01)
*G08B 25/00* (2006.01)
*G08B 13/00* (2006.01)

(52) U.S. Cl.
CPC ........... *G08B 29/185* (2013.01); *G08B 13/00* (2013.01); *G08B 25/001* (2013.01); *G08B 25/006* (2013.01); *G08B 25/008* (2013.01); *H04W 4/029* (2018.02); *G08B 29/188* (2013.01)

(58) Field of Classification Search
CPC .... G08B 29/185; G08B 13/00; G08B 25/001; G08B 25/006; G08B 25/008; G08B 29/188; H04W 4/029
See application file for complete search history.

(56) References Cited

U.S. PATENT DOCUMENTS

| | | | |
|---|---|---|---|
| 4,611,197 A | 9/1986 | Sansky | |
| 4,808,972 A * | 2/1989 | Nicholls | G08B 29/046 340/636.15 |
| 5,499,196 A | 3/1996 | Pacheco | |
| 6,943,682 B1 | 9/2005 | Dowens et al. | |
| 7,817,029 B1 | 10/2010 | Hillenburg et al. | |
| 7,986,228 B2 | 7/2011 | Friar et al. | |
| 8,786,425 B1 | 7/2014 | Hutz | |
| 9,035,763 B2 | 5/2015 | Poder et al. | |
| 9,384,656 B2 | 7/2016 | Patterson et al. | |
| 9,495,860 B2 | 11/2016 | Lett | |

(Continued)

*Primary Examiner* — John A Tweel, Jr.
(74) *Attorney, Agent, or Firm* — Banner & Witcoff, Ltd.

(57) ABSTRACT

Methods, systems, computer-readable media, and apparatuses for processing alarm signals are presented. In some embodiments, a mobile device may be registered with a security system that is installed at a premises. Subsequently, an alarm trigger associated with the security system may be received. Based on receiving the alarm trigger, the location of the mobile device may be determined. A response to the alarm trigger then may be determined based on the location of the mobile device.

24 Claims, 7 Drawing Sheets

(56) References Cited

U.S. PATENT DOCUMENTS

| | | | |
|---|---|---|---|
| 9,754,477 B2 | 9/2017 | Poder et al. | |
| 9,786,158 B2* | 10/2017 | Beaver et al. | |
| 10,176,706 B2* | 1/2019 | Beaver | G08B 29/185 |
| 10,262,526 B2 | 4/2019 | Poder et al. | |
| 10,271,333 B2 | 4/2019 | Cui et al. | |
| 10,325,484 B2 | 6/2019 | Saintellemy et al. | |
| 10,356,678 B2 | 7/2019 | Guo et al. | |
| 10,431,073 B2 | 10/2019 | Simon | |
| 10,930,140 B1 | 2/2021 | Stone et al. | |
| 10,950,120 B2 | 3/2021 | Poder et al. | |
| 2005/0264413 A1 | 12/2005 | Eskildsen | |
| 2013/0189946 A1 | 7/2013 | Swanson | |
| 2013/0249688 A1 | 9/2013 | Nguyen et al. | |
| 2017/0318510 A1 | 11/2017 | Guo et al. | |
| 2018/0115928 A1 | 4/2018 | Kim et al. | |
| 2018/0262905 A1 | 9/2018 | Dhanapal et al. | |
| 2019/0342927 A1 | 11/2019 | Ohseki et al. | |
| 2020/0029380 A1 | 1/2020 | Kawasaki et al. | |
| 2020/0037386 A1 | 1/2020 | Park et al. | |
| 2020/0170067 A1 | 5/2020 | Kawasaki et al. | |

* cited by examiner

PROCESSING ALARM SIGNALS

CROSS-REFERENCE TO RELATED APPLICATIONS

This application is a continuation of and claims priority to U.S. patent application Ser. No. 17/171,707, filed Feb. 9, 2021, which is a continuation of U.S. patent application Ser. No. 16/281,596, filed Feb. 21, 2019, now U.S. Pat. No. 10,950,120, issued Mar. 16, 2021, which is a continuation of U.S. patent application Ser. No. 15/658,720, filed Jul. 25, 2017, now U.S. Pat. No. 10,262,526, issued Apr. 16, 2019, which is a continuation of U.S. patent application Ser. No. 14/687,122, filed Apr. 15, 2015, now U.S. Pat. No. 9,754,477, issued Sep. 5, 2017, which is a continuation of U.S. patent application Ser. No. 13/826,489, filed Mar. 14, 2013, now U.S. Pat. No. 9,035,763, issued May 19, 2015, each of which is incorporated herein, by reference, in its entirety.

BACKGROUND

Aspects of the disclosure relate to hardware and computer software that may be used with or implemented by home security systems. In particular, various aspects of the disclosure relate to processing alarm signals, such as alarm signals that may be generated and/or received by a home security console or other security system controller device from one or more sensors installed at a premises.

Increasingly, houses, apartments, offices, and other premises are being secured with home security systems, which are also sometimes referred to as "burglar alarms." In addition to providing those who live and work in these places with a sense of security and greater peace of mind, many security systems are also beginning to provide users with a number of other beneficial features, such as the ability to remotely control and monitor a security system even when away from the monitored premises.

Despite advances in technology, however, false alarms continue to be an issue that can frustrate users of security systems. For example, not only can false alarms be a nuisance as a result of the unwanted noise, light, and attention that may accompany them, but false alarms can also have legal and financial consequences. For instance, some municipalities may impose fines and other penalties on homeowners if emergency responders (e.g., police units, fire units, ambulances, etc.) are dispatched in response to a false alarm at a home. There remains an ever-present need to minimize resources wasted on false alarms, and to improve efficiency of home security systems.

BRIEF SUMMARY

Aspects of the disclosure provide more effective ways of reducing false alarms by a security system, as well as more convenient and easy-to-use ways of managing a security system, such as a home security system.

In particular, various techniques are discussed below that enable an alarm to be automatically deactivated in certain circumstances in which the alarm is most likely to be a false alarm. One way in which some of the systems and methods discussed below can identify a false alarm is to determine and evaluate the locations of different mobile devices that belong to different people who reside or work at the premises where the alarm was triggered. Based on where particular mobile devices are located, conclusions can be reached about where the users of these devices are located and the veracity of an alarm can be determined.

Some embodiments discussed below also provide a number of additional and alternative features. For example, in some embodiments, an alarm may be verified by contacting one or more users of a security system in accordance with a contact tree that defines the order in which the users should be reached. Based on the locations of the users' mobile devices at or around the time that an alarm is triggered, such a call tree can be dynamically determined and/or modified, before any of the users are contacted, to increase the efficiency and likelihood of reaching the highest priority user(s). For instance, if mobile device location indicates that the first user in the call tree is not at home, then a security server can determine, based on the mobile device location for the user, that alarm verification call(s) should be placed to the user's mobile phone instead of their home phone.

In other embodiments, instead of determining that a particular alarm is false, the alarm can be verified as legitimate. For example, if a fire alarm is triggered at a premises and mobile device position information indicates that a person was in the house just prior to the alarm being triggered and quickly exited to a nearby location outside of the house after the alarm was triggered, an evaluation of the circumstances may result in a determination that the fire alarm is legitimate and first responders are needed to extinguish a fire at the premises. As discussed below, these circumstances and others may be defined in look-up tables and templates that can be used by various devices in evaluating alarms.

In some embodiments, other benefits may be provided by using mobile device location in determining how to respond to an alarm. For example, in situations where an alarm at a premises is real (rather than false) and emergency responders are dispatched to the premises, information about where certain mobile devices are located can be used to inform first responders about how many people may require assistance at the premises and what kinds of special needs they might have. For instance, mobile device location information may indicate that children or elderly persons with special medical needs are at the premises, which can accordingly be communicated to emergency responders to enable them to better respond to the alarm.

These features, along with many others, are discussed in greater detail below.

BRIEF DESCRIPTION OF THE DRAWINGS

Aspects of the disclosure are illustrated by way of example with respect to the accompanying figures, in which like reference numerals indicate similar elements, and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As introduced above, various aspects of the disclosure relate to processing alarm signals, particularly in situations where mobile device location information can be used to determine whether an alarm is legitimate or false. In several of the examples that are discussed below, the ways in which alarm-related information can be obtained and analyzed will be illustrated. Before turning to these examples, however, an example of an information distribution network which includes one or more of the computing devices discussed below, and which can be used in sending and receiving various messages and/or other data, will first be described. In addition, an example of a computing device and various hardware components that can be used in implementing one or more of the computing devices discussed herein will also be described.

Figure 1:
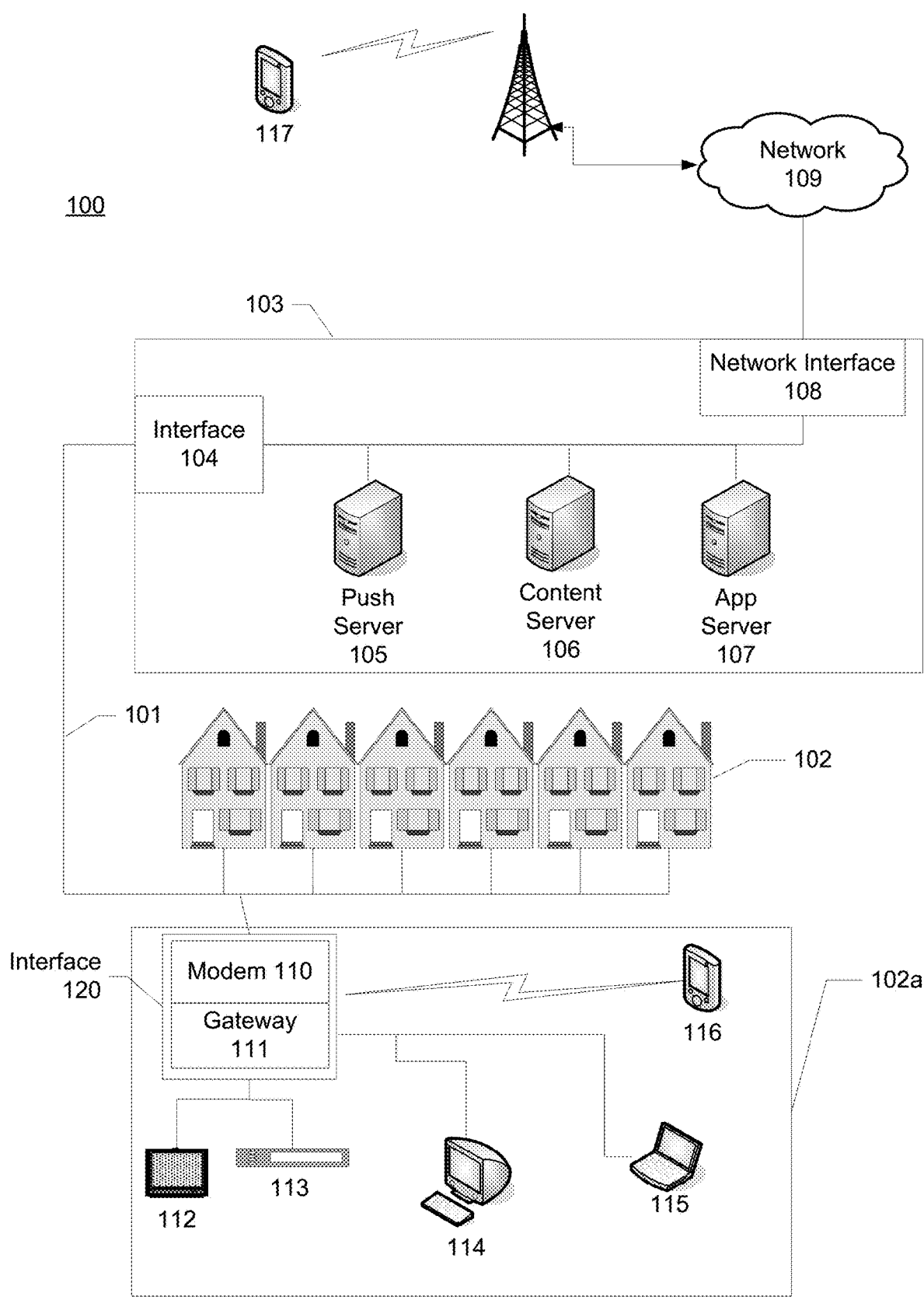
FIG. 1 illustrates an example system in which various features discussed herein may be implemented.

FIG. 1 illustrates an example information distribution network 100 on which many of the various features described herein may be implemented. Network 100 may be any type of information distribution network, such as a satellite network, a telephone network, a cellular network, a wireless network, and/or combinations thereof. For example, network 100 may be an optical fiber network, a coaxial cable network, or a hybrid fiber/coax (HFC) distribution network. Such a network 100 can use a series of interconnected communication links 101 (e.g., coaxial cables, optical fibers, wireless connections, etc.) to connect multiple premises 102 (e.g., businesses, homes, consumer dwellings, etc.) to a local office 103 (e.g., a headend, a central office, a processing facility, etc.). The local office 103 may transmit downstream information signals onto the links 101, and each premises 102 may have a receiver that can be used to receive and process those signals. The geographic location of the local office 103 can vary, and the local office 103 may be proximate to a user's neighborhood in some embodiments, while in other embodiments, the local office 103 may be located remotely at a centralized location. The various servers can be located anywhere, and their location might not be relevant to a user (e.g., the servers may be in the "cloud").

In some arrangements, there may be one link 101 originating from the local office 103, and it may be split a number of times to distribute the signal to various premises 102 in the vicinity (which may be many miles) of the local office 103. The links 101 may include components that are not illustrated, such as splitters, filters, amplifiers, etc., to help convey the signal clearly. Some portions of the links 101 also may be implemented with fiber-optic cable, while other portions may be implemented with coaxial cable, other lines, or wireless communication paths.

The local office 103 may include an interface 104, such as a termination system (TS) or a cable modem termination system (CMTS) in an example of an HFC-type network, which may be a computing device that is configured to manage communications between devices on the network of links 101 and backend devices, such as servers 105, 106, and 107 (which are discussed further below). In the example of an HFC-type network, the TS may be as specified in a standard, such as the Data Over Cable Service Interface Specification (DOCSIS), published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks, Internet devices, telephone networks, cellular telephone networks, fiber optic networks, local wireless networks (e.g., LTE, WiMAX, etc.), satellite networks, and any other desired network, and the interface 108 may include the corresponding circuitry needed to communicate on the network 109, and to communicate with other devices on the network, such as a cellular telephone network and its corresponding cell phones (e.g., cellular phone 117). Collectively, these networks 109 may be referred to herein as "the cloud" or "cloud architecture."

As noted above, the local office 103 may include a variety of servers that may be configured to perform various functions. For example, the local office 103 may include a back office server 105. The back office server 105 may generate push notifications related to functions, such as billing, reporting, and subscriber management to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users, who may be, for example, in the premises 102 (e.g., homes). In some embodiments, the content server 106 may include software to validate (or initiate the validation of) user identities and entitlements, locate and retrieve (or initiate the location and retrieval of) requested content, encrypt the content, and initiate delivery (e.g., streaming, transmitting via a series of content fragments) of the content to the requesting user and/or device. Other server computing devices may be present as well, such as one or more application servers 107, which are discussed below. Also, the various servers and elements are depicted in a local office 103, but they need not be co-located in a common premises, and instead may have some or all elements located remotely in the network 109.

The local office 103 may further include one or more application servers 107 and/or may communicate with one or more application servers 107 that may be maintained in the cloud 109. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX, and COMET). For example, an application server 107 may be responsible for collecting television program listings information and generating a data download for electronic program guide listings. Another application server 107 may be responsible for monitoring user viewing habits and collecting that information for use in selecting advertisements. Another application server may be responsible for formatting and inserting advertisements in a video stream and/or content item being transmitted to the premises 102. As discussed below, still another application server 107 may be used to monitor and/or otherwise communicate with one or more security systems that may be deployed at various locations, such as the premises 102.

An example premises 102 a may include an interface 120, which may include a modem 110 (or another receiver and/or transmitter device suitable for a particular network), which may include transmitters and receivers used to communicate on the links 101 and with the local office 103. The modem 110 may be, for example, a coaxial cable modem (for coaxial cable lines 101), a fiber interface node (for fiber optic links 101), or any other desired modem device. The modem 110 may be connected to, or be a part of, a gateway interface device 111. The gateway interface device 111 may be a computing device that communicates with the modem 110 to allow one or more other devices in the premises 102 a to communicate with the local office 103 and other devices beyond the local office. The gateway 111 may be a set-top box (STB), digital video recorder (DVR), computer server, or any other desired computing device. The gateway 111 may also include local network interfaces (not shown) that can provide communication signals to other devices in the premises 102 a (e.g., user devices), such as televisions 112, additional STBs 113, personal computers 114, laptop computers 115, wireless devices 116 (e.g., wireless laptops and networks, mobile phones, mobile televisions, tablet computers, PDAs, etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), 4G, WiMAX, LTE, Bluetooth interfaces, and others. In some embodiments, the system may use ZigBee and Z-Wave compliant devices.

Figure 2:
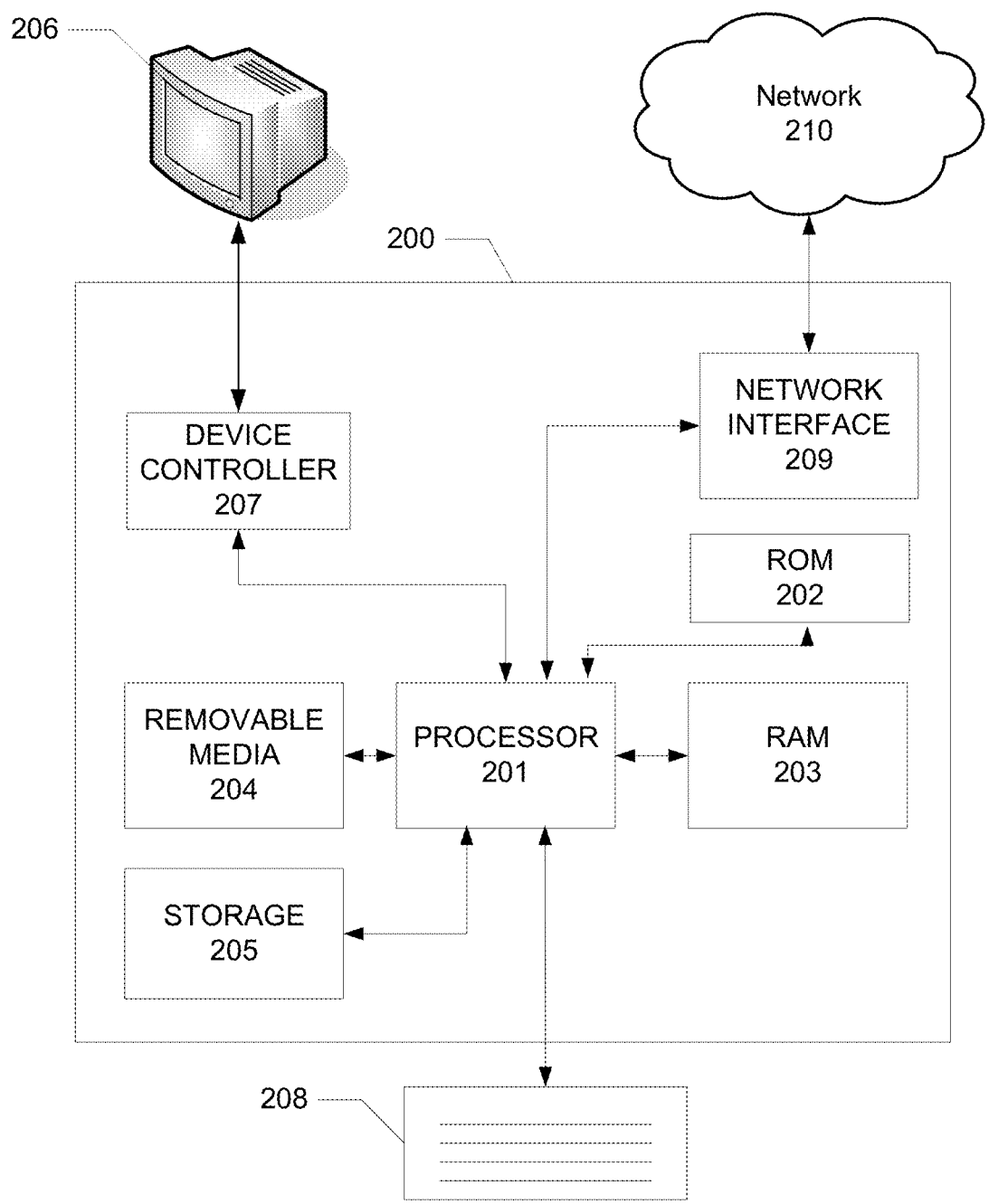
FIG. 2 illustrates an example computing device that may be used to implement any of the computing devices and servers discussed herein.

FIG. 2 illustrates general hardware elements that can be used to implement any of the various computing devices discussed herein. The computing device 200 may include one or more processors 201, which may execute instructions of a computer program to perform any of the features discussed herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces 209, such as input/output circuits (such as a network card) to communicate with an external network 210. The network interface 209 may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

FIG. 2 shows an example hardware configuration. Modifications may be made to add, remove, combine, and/or divide, etc., components as desired. Additionally, the components illustrated may be implemented using basic computing devices and components, and the same components (e.g., processor 201, ROM 202, user input devices 208, etc.) may be used to implement any of the other computing devices and components described herein. For example, the various components herein may be implemented using computing devices having components such as a processor executing computer-executable instructions stored on a computer-readable medium (e.g., storage 205), as illustrated in FIG. 2.

One or more aspects of the disclosure may be embodied in computer-usable data and/or computer-executable instructions, such as in one or more program modules, executed by one or more computers or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media, such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents, such as integrated circuits, field programmable gate arrays (FPGAs), and the like. Particular data structures may be used to more effectively implement one or more aspects of the disclosure, and such data structures are contemplated as being within the scope of computer executable instructions and computer-usable data described herein.

Having described an example of an information distribution network and an example of a computing device that may be used in implementing various aspects of the disclosure, several examples illustrating how alarm signals may be processed in some embodiments will now be described in greater detail.

Figure 3:
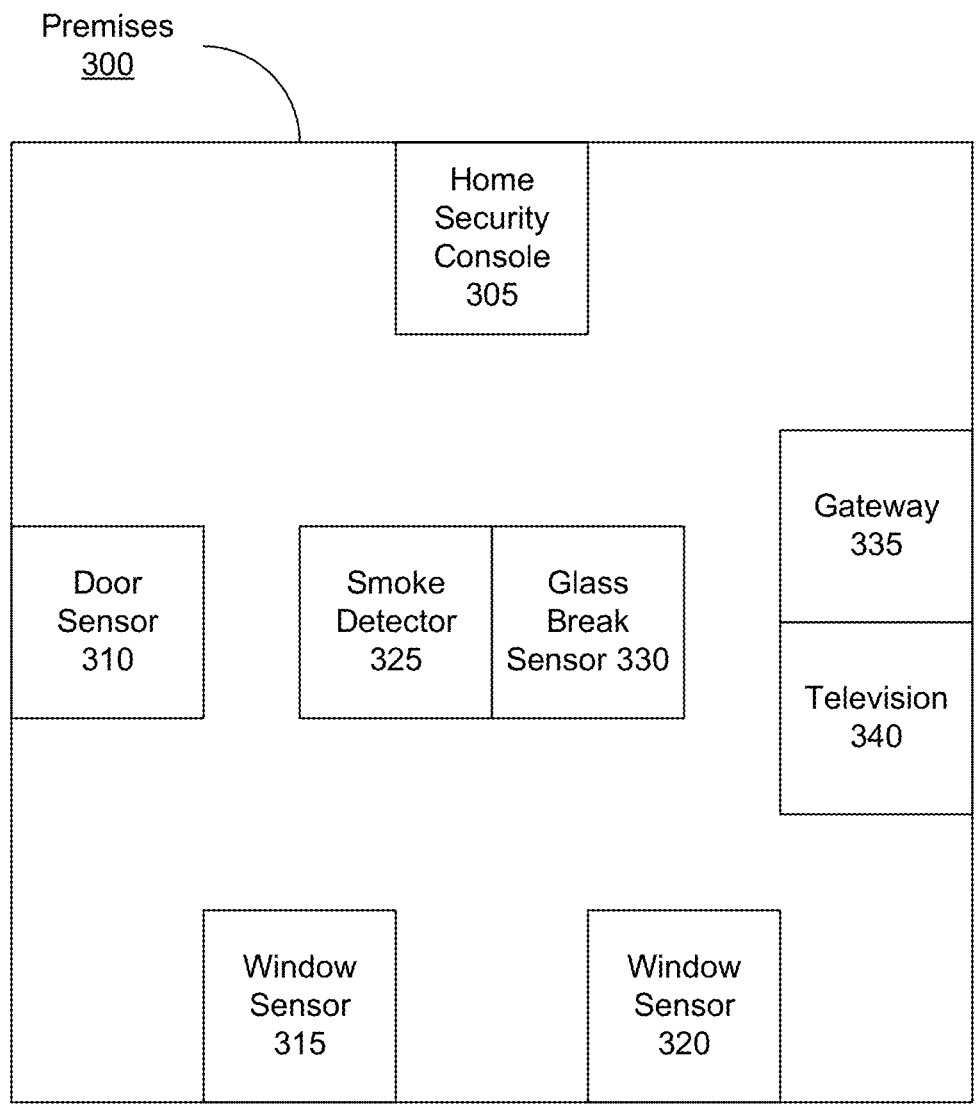
FIG. 3 illustrates an example premises at which a home security console may be deployed.

FIG. 3 illustrates an example premises 300, such as a home, that includes a security system, such as a home security system. As seen in FIG. 3, the home security system deployed at premises 300 may include a home security console 305 and a number of sensors that can be configured to detect various occurrences and/or other changes in state(s) at premises 300. For example, the home security system deployed at premises 300 may include a door sensor 310 that is configured to detect whether a door at premises 300 is open or closed. In addition, the security system deployed at premises 300 may include a number of window sensors, such as window sensor 315 and window sensor 320, that are each configured to detect whether a particular window is open or closed. The home security system deployed at premises 300 also may include a smoke detector 325 that is configured to detect whether smoke is present at premises 300, and further may include a glass break sensor 330 that is configured to detect the sound associated with a window or other glass object breaking at the premises. Any and/or all of these sensors may be communicatively coupled via one or more wired and/or wireless connections to home security console 305, which may send and/or receive signals to and/or from the various sensors. In addition, by analyzing signals received from the various sensors, home security console 305 may be able to determine whether one or more alert criteria are met, and accordingly, whether an alarm should be triggered and/or whether other alert actions should be taken. Additionally, while FIG. 3 shows a particular number and configuration of sensors which may be included in a security system deployed at a premises in one embodiment, any number of sensors, as well as any number of home security consoles and/or different types of sensors, may be included in a home security system in other embodiments.

In addition to including a home security console and a number of sensors, premises 300 also may include a gateway 335 and a display, such as a television 340. In some embodiments, gateway 335 may implement one or more aspects of the gateway interface device 111, which was discussed above with respect to FIG. 1. This may, for instance, include receiving and/or decoding content via an information distribution network, as well as displaying and/or playing back such content on television 340. In some additional and/or alternative embodiments, gateway 335 and home security console 305 may be implemented in a single device that, for example, is configured to both monitor the various sensors that are installed at premises 300 and facilitate electronic communications (e.g., with a local office, such as local office 103, via one or more communication networks, such as network 100, etc.).

During its typical course of operation, home security console 305 may monitor signals received from the various sensors located at the premises 300 and also may communicate with one or more other devices that are located at and/or used in the premises. Some of these other devices may be mobile devices (e.g., cellular phones, smart phones, tablet computers, etc.) that belong to various people who reside at the premises. In exchanging various types of information with these mobile devices, home security console 305 also may obtain location information from the mobile devices that enables home security console 305 to determine where particular mobile devices are at any given time, and subsequently infer where certain users are located based on the location of their respective device(s).

As discussed above, a security system, such as home security console 305, may be able to determine, in some instances, that an alarm is false (and/or make other conclusions about the alarm) based on location information received from one or more mobile devices. An example of such a situation will now be discussed in greater detail with respect to FIG. 4.

Figure 4:
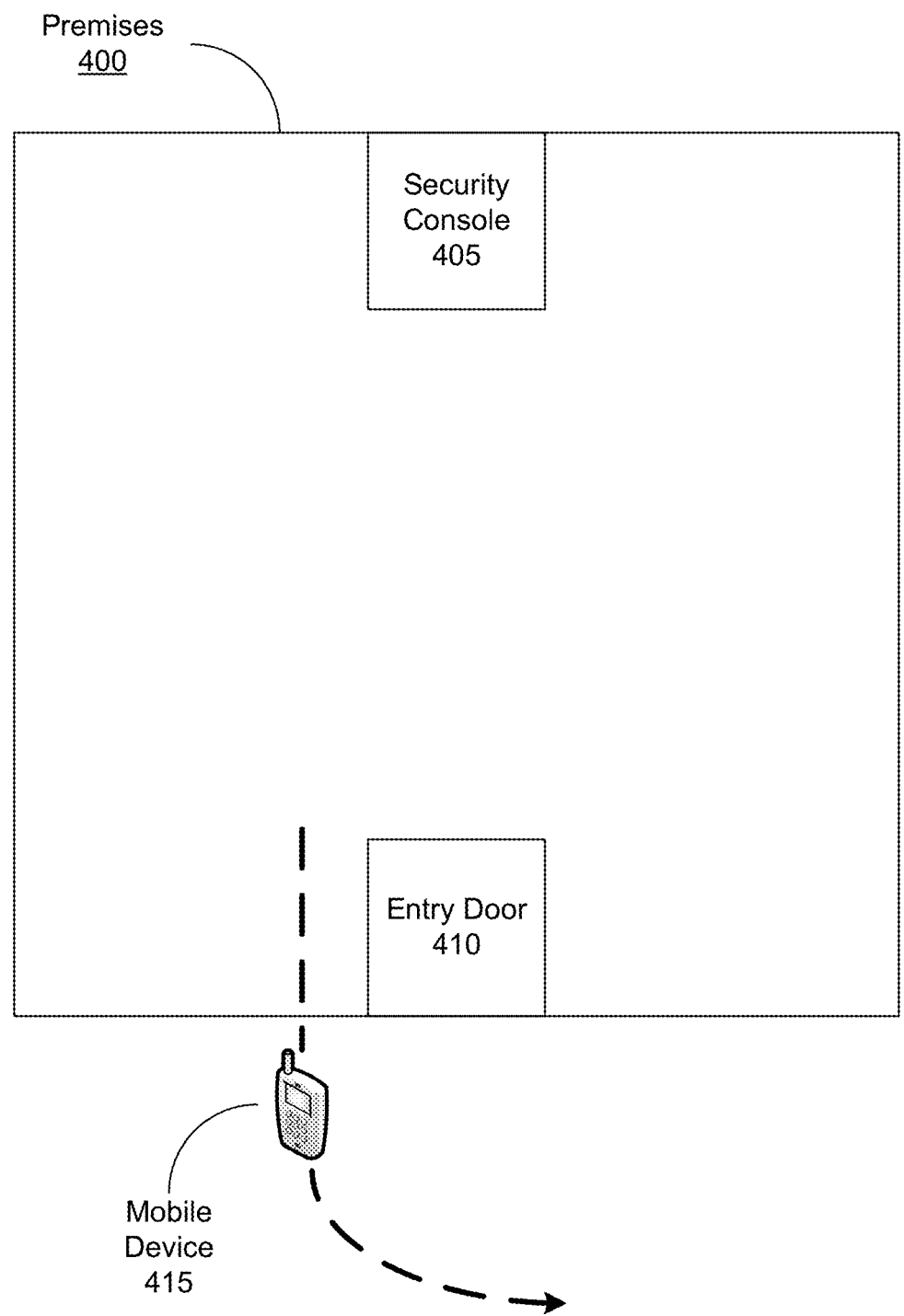
FIG. 4 illustrates an example of processing alarm signals according to one or more aspects of the disclosure.

FIG. 4 illustrates an example of processing alarm signals according to one or more aspects of the disclosure. In particular, the example depicted in FIG. 4 illustrates how certain techniques can be used to automatically determine that an alarm is false and should be deactivated.

As seen in FIG. 4, an example premises 400 may include a security console 405 and an entry door 410. A mobile device 415, which belongs to a resident of the premises 400, may be registered with the security console 405. As a result of this registration, security console 405 (and/or a security server that is integrated into or communicatively coupled to security console 405) may be able to monitor the position of mobile device 415 and make decisions about how to respond to an alarm at the premises 400 based on the position of mobile device 415.

For instance, in the example situation illustrated in FIG. 4, a user may initiate an arming sequence by operating security console 405 (e.g., to place the security system installed at premises 400 in an armed state). The initiation of the arming sequence may start a countdown timer that provides the user with a predetermined amount of time (e.g., twenty seconds) to exit the premises 400 (e.g., via entry door 410) before the security system enters the armed state.

For whatever reason, however, the user in this example might not exit the premises 400 quickly enough. As a result, the countdown timer may expire before the user exits the premises 400, and an alarm may be triggered. Despite the alarm being triggered, however, the user in this example might, for whatever reason, leave the premises 400 without manually deactivating the alarm. For instance, the user might not realize that the alarm has been triggered, or the user might be in a hurry and does not wish to take the time to deactivate the alarm.

With a conventional security system, the alarm in this example may continue to sound and other alarm actions, including actions that escalate the alarm, may occur. For example, as the alarm continues at the premises 400, police officers and/or other emergency responders may be alerted and subsequently may travel to the premises 400 to respond to the alarm. Because the alarm is a false alarm in the example, the user subsequently may incur a fine or other penalty as a result of the emergency responders responding to the false alarm at the premises 400.

Using one or more aspects of the disclosure, however, some of the negative consequences that might otherwise arise in this situation may be mitigated, if not avoided entirely. For example, in accordance with one or more embodiments, security console 405 may obtain position information from mobile device 415 and use the position information to determine whether it is likely that the alarm triggered at premises 400 is false. In particular, in the example illustrated in FIG. 4, security console 405 may be able to determine, upon analyzing position information obtained from mobile device 415, that the user was inside premises 400 just before the alarm was triggered and left the premises 400 within a predetermined amount of time of the alarm being triggered (e.g., within ten seconds of the alarm being tripped). Based on this determination, and potentially further based on one or more templates that define how such location information can be interpreted, the security console 405 may determine that the circumstances surrounding the alarm, as well as the position(s) of the mobile device 415 in relation to the alarm being tripped, correlate with a profile defined in the template(s) that are indicative of the alarm being false. The security console 405 may deactivate the alarm accordingly, which may potentially avoid emergency responders being dispatched to the premises 400, along with the other negative consequences of the false alarm.

In another example, a user of mobile device 415 may have armed the security system installed at premises 400, and after forgetting that the security system is armed, may have temporarily exited the premises 400 (e.g., to take out the trash, to pick up the mail, to walk the dog, etc.). In this example, the security system may begin a countdown sequence while the user of mobile device 415 is in the driveway of the premises 400, and the countdown sequence may end (with the alarm beginning to sound) before the user of mobile device 415 can get back inside the house to disarm the security system. By implementing certain aspects of the disclosure, the alarm triggered by the security system may be automatically deactivated in these circumstances. For example, in accordance with various embodiments, security console 405 may determine, based on position information obtained from mobile device 415, that the user of mobile device 415 is located proximate to the premises 400 (or within a predetermined threshold distance of the premises 400, e.g., because he or she is in the driveway or in the yard). Based on this determination, and potentially further based on one or more templates that define how such location information can be interpreted (e.g., one or more templates that define the predetermined threshold distance for the user to be considered sufficiently close to the premises for the alarm to be deactivated), the security console 405 may determine that the circumstances surrounding the alarm, as well as the position(s) of the mobile device 415 in relation to the alarm being tripped, correlate with a profile defined in the template(s) that are indicative of the alarm being false. The security console 405 may deactivate the alarm in accordance with this determination, which may potentially avoid emergency responders being dispatched to the premises 400, along with the other negative consequences of the false alarm.

In some instances, a security system may use mobile device position information to provide other features, instead of or in addition to automatically deactivating alarms that are likely false. For example, mobile device position information may be used, in some instances, to provide enhanced information to emergency responders in situations where an alarm is legitimate. As illustrated below, this enhanced information may include information about the residents and/or other occupants of a particular premises, such as the number of people present in the premises, the ages and/or special needs (e.g., medical conditions) of the residents and/or other occupants, and/or other information. An example of such a situation will now be discussed with respect to FIG. 5.

Figure 5:
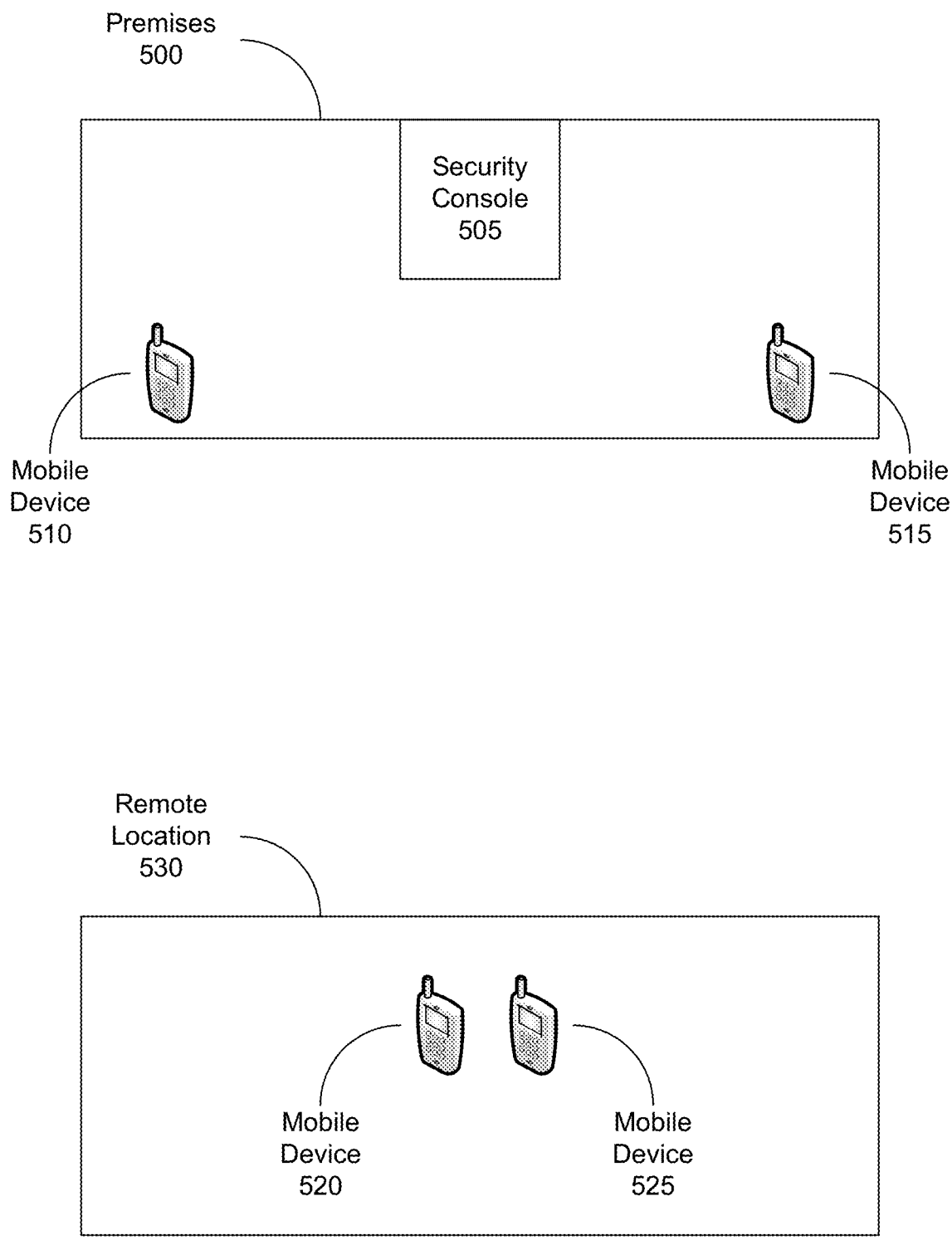
FIG. 5 illustrates another example of processing alarm signals according to one or more aspects of the disclosure.

FIG. 5 illustrates another example of processing alarm signals according to one or more aspects of the disclosure. In particular, the example depicted in FIG. 5 illustrates how some aspects of the disclosure can be implemented to enhance the ways in which a legitimate alarm is handled.

As seen in FIG. 5, an example premises 500 may include a security console 505, which may implement one or more aspects of the other security consoles discussed above. Several mobile devices, including mobile device 510, mobile device 515, mobile device 520, and mobile device 525 may be registered with security console 505, and security console 505 may thus be able to monitor the locations of these various mobile devices. Additionally, in this example, each of the four mobile devices may be used by, and linked to, a different resident of the premises 500. In particular, mobile device 510 may be linked to a first child who resides at premises 500, mobile device 515 may be linked to a second child who resides at premises 500, mobile device 520 may be linked to a father who resides at premises 500, and mobile device 525 may be linked to a mother who resides at premises 500.

In the example situation illustrated in FIG. 5, the two children who are registered users of mobile devices 510 and 515 may be home alone at the premises 500, and the two parents who are registered users of mobile devices 520 and 525 may be away from the home and at a remote location 530 (e.g., at a restaurant, at a movie theater, etc.).

While the two parents are away from premises 500 and visiting the remote location 530, a fire alarm may, for example, be triggered at the premises 500. After the fire alarm has been triggered, the security console 505 may electronically report the file alarm to a local Public Safety Answering Point (PSAP), which may coordinate a response to the fire alarm by one or more emergency responders (e.g., police units, fire department units, ambulances, etc.).

In addition to simply reporting the fire alarm to the local PSAP, however, security console 505 also may, in accordance with one or more embodiments, collect and/or determine additional information about the people who may be present at the premises 500, and subsequently may provide this additional information to the local PSAP. For example, after the fire alarm is triggered, security console 505 may determine where all of the registered devices are located, as this may be indicative of where the users of these devices are located. In this example, this determination may further result in security console 505 determining that the devices linked to the children who reside at the premises (e.g., mobile devices 510 and 515) are located at the premises 500, while the devices linked to the adults who reside at the premises (e.g., mobile devices 520 and 525) are located away from the premises 500 at a remote location 530. Based on this location information, security console 505 subsequently may determine that the children are home alone and that the adults are out of the house.

After the registered mobile devices have been located, security console 505 may report any and/or all of the location information, as well as any and/or all of the determination results discussed above, to the local PSAP. The local PSAP may then, for instance, provide any and/or all of this information to first responders, who can better tailor their response to the fire alarm with the benefit of having more information about the current circumstances at premises 500 beyond the mere fact that the fire alarm has been triggered there. For example, with the information provided by security console 505, the first responders may be able to enter the premises 500 knowing that they need to locate and/or rescue at least two children. Other information may similarly be obtained and provided to fire responders in other instances, such as any health conditions or other special needs of people who may be at the premises 500. As discussed below, some of this information may be obtained from user profile data that can be stored by the home security console 505.

Having described several example situations in which some aspects of the disclosure may be utilized, an example of the processing that may be performed (e.g., by a security console) in some embodiments will now be discussed in greater detail with respect to FIG. 6.

Figure 6:
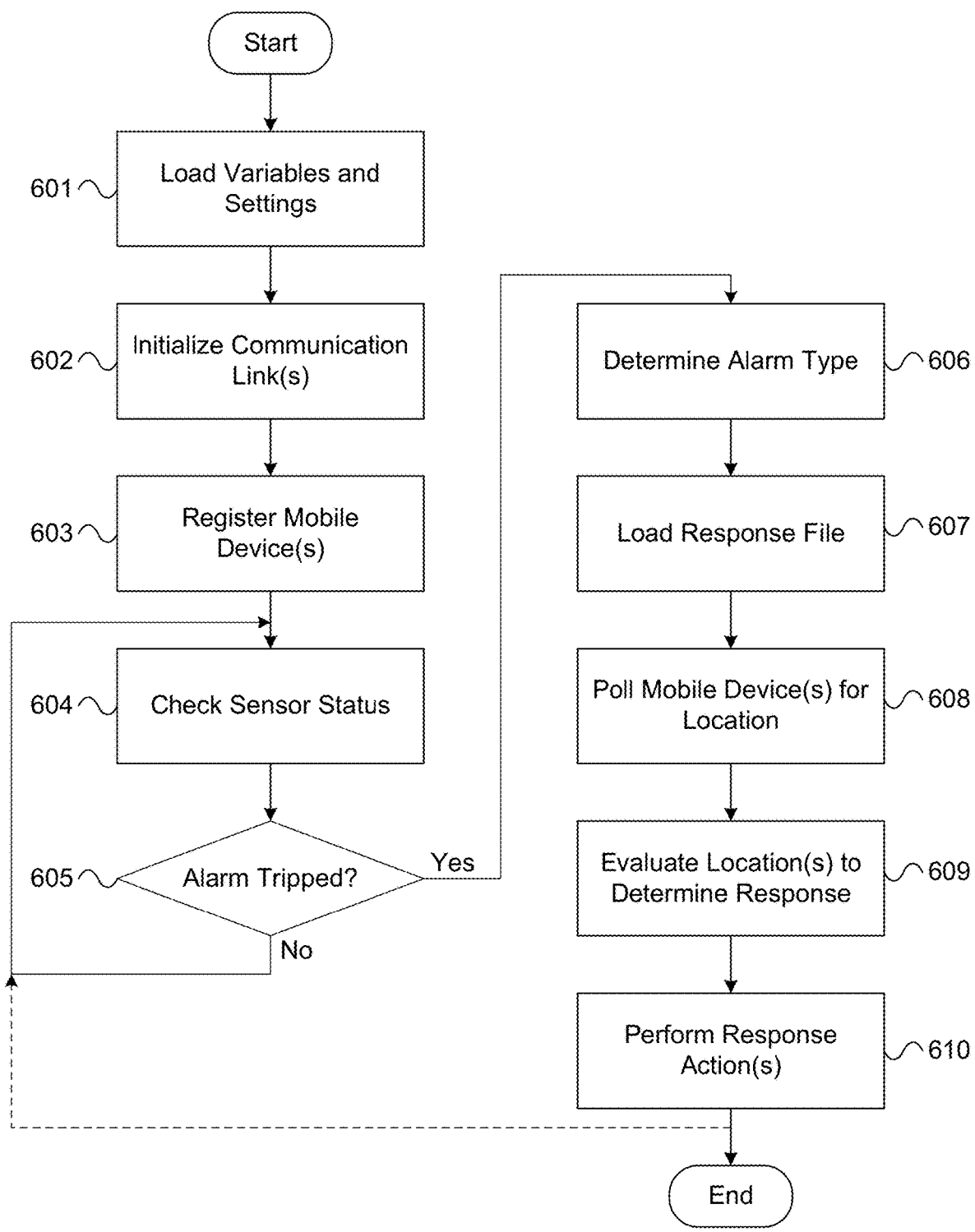
FIG. 6 illustrates a flowchart that depicts an example method of processing alarm signals according to one or more aspects of the disclosure.

FIG. 6 illustrates a flowchart that depicts an example method of processing alarm signals according to one or more aspects of the disclosure. In some embodiments, the method illustrated in FIG. 6 can be performed by a security console located at a particular premises (e.g., home security console 305 at premises 300), or by a security server that is communicatively coupled to the security console and located remotely from the premises (e.g., at local office 103). In other embodiments, one or more steps of the method may additionally or alternatively be performed by another device (e.g., by another security console that is also located at the same premises, in a situation where two or more security consoles are present at the premises). While a number of steps are illustrated in the figures (including the steps illustrated in FIG. 6) and discussed below as being performed in a certain order in some embodiments, in other embodiments, these steps may be performed in different orders. In addition, some steps may be combined or might not be performed at all, and/or one or more additional or alternative steps may be performed in addition to or instead of those illustrated in the figures and discussed below.

When initially powered on, the particular computing device that is performing the method illustrated in FIG. 6 may first execute a number of configuration steps. For example, in step 601, the device (e.g., a security console, such as security console 305; a security server, such as application server 107; etc.) may load a number of different variables and settings. Examples of the types of variables and settings that may be loaded include user preferences (e.g., regarding passcodes for the security system, a length of time to be used for the countdown timer during the arming process, etc.), networking information (e.g., network addresses for sensors installed at the premises, network addresses for one or more monitoring server(s) that monitor the security system at the premises, etc.), and user profile information (e.g., identifiers associated with previously registered user devices, various information about different people who reside at the premises, including their names, ages, health conditions, special needs, etc.).

In step 602, the computing device (e.g., the security console, the security server, etc.) may initialize one or more communication links. This initialization may, for instance, include establishing electronic connections (e.g., via one or more networks, such as distribution network 100) with one or more sensors installed at the premises, one or more monitoring servers, and other servers and devices with which the computing device may exchange data (e.g., a server operated by a local PSAP).

In step 603, the computing device (e.g., the security console, the security server, etc.) may register one or more mobile devices. This registration may, for instance, enable the security console to recognize the registered device(s) as belonging to a particular person who resides at the premises where the security system is installed, and in some embodiments, this registration may be initiated and/or completed on one of the mobile devices being registered (e.g., by a user of such a mobile device). In some instances, the one or more mobile devices registered in step 603 may be mobile devices that have not been previously registered with the security console, while in other instances, the security console may re-register previously registered mobile devices each time that the security console is powered on and/or initialized.

In registering with one or more mobile devices, the computing device (e.g., the security console, the security server, etc.) may request, receive, and store identification information that can be used to identify the mobile devices themselves, as well as user profile information that can be used to provide more customized experiences to the users of these mobile devices. For example, the user profile information that may be requested, received, and stored by the security console (or other computing device) may include the name(s), age(s), gender(s), language preference(s), health condition(s), special need(s), family relationship(s) (e.g., the identities of the user's mother, father, sibling(s), spouse, etc.), and/or other information for each person who may use each of the mobile devices being registered. In some instances, a particular mobile device may be used by more than one resident of the premises (e.g., two children may share a single tablet computer). In these instances, user profile information may be requested, received, and stored for each user of the mobile device during registration, as this information may later be used by the security console in processing alarm signals (e.g., if user profile information indicates that a certain mobile device has multiple users, then when and/or after an alarm has been tripped, the security console may prompt the user(s) to identify which user(s) are with the device, so as to enable one or more aspects of the location-based alarm processing discussed herein).

After performing one or more of these configuration steps, the computing device (e.g., the security console, the security server, etc.) may enter a monitoring loop in which it periodically checks the state of various sensors at the premises (e.g., in step 604) and subsequently determines, based on the states of the sensors, whether alert criteria have been met and whether an alarm has accordingly been tripped (e.g., in step 605). In addition to checking the states of various sensors, the security console also may perform other actions during this monitoring loop. For example, the security console also may send and/or receive heartbeat messages to and/or from other devices that are located at the premises or at another location, the security console may update or otherwise maintain one or more counters and/or clocks, and the security console may perform other idle processing actions.

If it is determined during the monitoring loop that an alarm has been tripped (e.g., in step 605), then the computing device (e.g., the security console, the security server, etc.) may perform a series of steps in order to locate the registered mobile devices and determine how to respond to the alarm.

For example, in step 606, the computing device (e.g., the security console, the security server, etc.) may determine what type of alarm has been triggered. Different types of alarms may, for instance, include burglar alarms, fire alarms, medical alarms, and other types of alarms. The device's response to a particular alarm may depend on the type of alarm that has been triggered, as different types of alarms may call for different types of responses.

In step 607, the computing device (e.g., the security console, the security server, etc.) may load a response file. The particular response file that is loaded may be selected based on the type of alarm that has been triggered. The response file may, for example, include a look-up table that defines a template for responding to alarms of a certain type based on the circumstances surrounding the alarm that has been triggered. For instance, a look-up table that defines a template for responding to burglar alarms may specify various sets of circumstances that are indicative of, and can be used in identifying, false alarms in situations where a burglar alarm has been tripped. These sets of circumstances may be defined in terms of different sensor conditions (e.g., which sensors tripped, in which order were the sensors tripped, etc.), different timing considerations (e.g., how much time elapsed since the mobile device(s), and presumably the user(s), were located at a particular location, such as in the premises or by a particular entry door of the premises, etc.), different mobile device movement patterns (e.g., whether the mobile device(s) are moving towards or away from the premises, as well as the direction and/or speed at which such device(s) are traveling, etc.), and/or other conditions that can be sensed or otherwise determined by the mobile device or the security console. An example of such a look-up table, which includes different sets of circumstances for evaluating a burglar alarm, is illustrated in TABLE A below:

TABLE A

| Condition Set Number | Sensor(s) Tripped | Sensor(s) Not Tripped | Time Since Alarm Started | Time Since Mobile Device Was at Premises | Mobile Device Proximity to Premises | Alarm Likely False? |
|---|---|---|---|---|---|---|
| 1 | Front Door Sensor | Back Door Sensor; | 30 seconds | 25 seconds | Within 200 yards | Yes |

TABLE A-continued

| Condition Set Number | Sensor(s) Tripped | Sensor(s) Not Tripped | Time Since Alarm Started | Time Since Mobile Device Was at Premises | Mobile Device Proximity to Premises | Alarm Likely False? |
|---|---|---|---|---|---|---|
| | | First Floor Motion Sensors; Second Floor Motion Sensors | | | | |
| 2 | Back Door Sensor; First Floor Motion Sensors | Front Door Sensor; Second Floor Motion Sensors | 30 seconds | 20 seconds | Within 400 yards | Yes |
| 3 | First Floor Motion Sensors; First Floor Glass Break Sensor | Front Door Sensor; Back Door Sensor; Second Floor Motion Sensors | 15 seconds | 2 hours | More than 10 miles | No |

While the examples discussed above involve loading a response file, the computing device may, in other embodiments, load a look-up table (that, e.g., defines a template for responding to alarms) from another source. For example, in some arrangements, such a look-up table may be stored and/or maintained in a central database (e.g., rather than as a local response file). In these arrangements, the computing device may, in step 607, load the look-up table by accessing and/or retrieving information from such a central database (e.g., rather than loading a local response file to retrieve the table).

After loading an appropriate response file (e.g., in step 607), in step 608 the computing device (e.g., the security console, the security server, etc.) may poll the one or more registered mobile devices in order to obtain information about where the registered devices are currently located. This polling may, for instance, include sending a request for current or updated location information to the mobile device(s), and further may include receiving location information from the mobile device(s) in response to such a request. In some instances, the location information received from a particular mobile device may simply include the geographic coordinates of a single point that represents the mobile device's current position. In other instances, such location information may additionally or alternatively include a set of geographic coordinates, as well as corresponding timestamp information, that together model a recent trajectory or motion pattern of the mobile device.

In step 609, the computing device (e.g., the security console, the security server, etc.) may evaluate the location information received from the one or more registered mobile devices in order to determine how to respond to the alarm. In evaluating this location information, the computing device may compare the location information and the state of various sensors at the premises with the look-up table included in the response file. Based on this comparison, the computing device may determine which set of circumstances in the look-up table most closely matches the actual circumstances (e.g., in terms of how the alarm was tripped and where the registered device(s) are), and subsequently may determine how to respond to the alarm based on this matching. For example, if the computing device determines, based on the actual circumstances and an appropriate look-up table, that the alarm is likely false, then the computing device may determine to automatically deactivate the alarm.

In step 610, the computing device (e.g., the security console, the security server, etc.) may perform the one or more actions (e.g., determined in step 609) in order to respond to the alarm. For example, if it was determined in step 609 that the alarm should be deactivated, then in step 610, the security console may deactivate the alarm. Thereafter, the computing device may return to the monitoring loop discussed above (e.g., to periodically check sensor status in step 604 and determine whether an alarm has been tripped in step 605), or the method may end.

As illustrated above, the ways in which a computing device, such as a security console, responds to a particular alarm may depend on the location information received from the registered mobile device(s) and on the template defined in the look-up table. In some instances, in addition to (or instead of) determining that an alarm is false and should be deactivated, the computing device may also (or instead) determine and perform other actions in responding to an alarm at a premises.

For example, a security console may, in some instances, determine that an abort window should be modified based on the location(s) of registered mobile device(s). Such an abort window may, for instance, specify an amount of time that the security console will wait before alerting first responders (e.g., by sending a request for help to a local PSAP) once an alarm is triggered at a premises. Thus, in one example, if the security console determines that a burglar alarm has been tripped and a registered mobile device is present at the premises, the security console may modify an abort window to extend the amount of time that a user has to manually deactivate the alarm before police units are called. In some arrangements, an alarm at the premises may be verified before first responders are notified (e.g., before a local PSAP is contacted about the alarm). In some instances, an alarm may be verified at a central station (which may, e.g., be included in local office 103 and/or in another location and/or office) by a security professional based on data obtained from and/or presented by the security system at the premises. In other instances, an alarm may be verified at the premises (e.g., by a resident of the premises) based on similar information. In verifying the alarm, the security professional and/or the resident may, for instance, evaluate and decide whether an emergency is occurring at the premises and whether the local PSAP should be contacted accordingly.

In other instances, a security console may dynamically determine and/or modify a call tree based on the location(s) of registered mobile device(s). Such a call tree may, for instance, specify two or more contact telephone numbers that can be dialed in a certain order in attempting to reach one or more resident(s) of the premises when an alarm needs to be verified. If, for example, the security console determines, based on mobile device location information that a particular resident of the premises is not at home, then the security console may determine and/or modify a call tree to prioritize the resident's mobile telephone number over his or her home telephone number. Although dialing telephone numbers are discussed in several examples here, in some instances, a call tree may additionally or alternatively include other forms of contact information (e.g., in addition to or instead of telephone numbers), which may enable the security console to contact resident(s) via other modes of communication. For example, the call tree may include one or more mobile phone numbers (e.g., which may enable the security console to contact resident(s) using text messaging, such as SMS and/or MMS, push notification, email, etc.), one or more email addresses (e.g., which may enable the security console to contact resident(s) via email), and/or one or more screen names (e.g., which may enable the security console to contact resident(s) via instant messaging). Any other forms of communication may likewise be included in a call tree, as may be desired.

In still other instances, in responding to an alarm at a premises, a security console may determine presence information based on the location(s) of registered mobile device(s). Such presence information may, for example, include the number of registered mobile device(s) present at the premises, an estimated number of people present at the premises (e.g., determined based on the number of mobile device(s) that are present at the premises), and/or personal information about the people who are likely at the premises (e.g., based on their mobile device(s) being present at the premises). In addition, this personal information may include the names and ages of the people who are likely at the premises, as well as other information about these people, including their language abilities and preferences, any known medical conditions, disabilities, special needs, etc. As noted above, any and/or all of this personal information may be stored and maintained by the registered mobile devices and/or the security console as user profile data.

In some instances, in evaluating location information from the registered mobile device(s), the security console also may consider recent locations and/or changes in position of the registered mobile device(s) in addition to the current position(s) of the device(s). For example, the security console may consider changes in position of the registered mobile device(s) to determine that a user of one of the devices is moving farther away from the premises. This determination can then be used by the security console in determining how to respond to the alarm (e.g., as a user's direction of travel relative to the premises may be a factor that is evaluated in accordance with certain response files and/or look-up tables).

In other instances, in evaluating location information from the registered mobile device(s), the security console also may verify an alarm at the premises as being legitimate based on the location information. For example, if a fire alarm has been tripped at the premises and the security console (and/or one or more related systems, e.g., a security server or other security device) determines, in evaluating the location information from the registered mobile device(s), that the resident(s) are fleeing the premise(s), then the security console may determine that the alarm is legitimate and that first responders (e.g., the fire department) are needed at the premises. As a result of verifying the legitimacy of the fire alarm in this way, the security console may, for instance, expedite the process of notifying the local PSAP that assistance is needed at the premises (e.g., by shortening an abort window that might otherwise allow a resident of the premises to manually deactivate the fire alarm).

In addition to taking into account the locations of registered mobile devices and other circumstances surrounding an alarm, such as the state of various sensors, the security console also may consider other factors in determining how to respond to an alarm at a premises. For instance, in some embodiments, the one or more mobile devices registered with the security console (e.g., in step 603 of the example method discussed above) may be prioritized. This prioritization can then be used by the security console in evaluating location information obtained from the mobile devices and in determining how to respond to an alarm.

For example, in some instances, a user might have multiple mobile devices, such as a smart phone and a tablet computer, and both of these devices may be registered with the security console as belonging to this same user. In these instances, the two mobile devices may be prioritized by the security console in order to reflect the different ways in which the devices are used. For instance, the user may typically take their smart phone with them whenever they leave the house, but may typically leave the tablet computer at home and only occasionally take it out of the house. Thus, the user may provide input to the security console that prioritizes the smart phone over the tablet computer when evaluating mobile device location information in alarm response situations, as the smart phone may be a better indicator of the user's location than the tablet computer.

In other instances, the security console may infer a user's position as being different from the position(s) of the user's registered mobile device(s). Such an inference may, in some circumstances, more accurately reflect the actuality of a situation where the user is not in the same place as his or her registered mobile device(s). For example, in a situation where the user is home alone and a fire alarm trips at the premises, the security console may detect that after the fire alarm was triggered, the front door was opened (e.g., based on a change in state of a door sensor) and motion was detected in an entry hallway (e.g., suggesting that the user has left the house). In this example situation, however, mobile device position information may indicate that the user's registered mobile device is still inside the house (e.g., because the user left his or her smart phone behind when fleeing the house). Based on these circumstances, the security console may infer that the user is in a different place than his or her mobile device and may determine that the user has instead left the premises. The security console may subsequently use this inference in reporting the number of people expected to be inside the house to first responders, for instance, when notifying a local PSAP of the fire alarm (e.g., by generating an automated telephone call to the local PSAP and using text-to-speech functionality to inform an operator at the local PSAP of these conditions; by generating and sending a text message to the local PSAP and/or a message receiving system at such a PSAP; etc.). The security console may also report this information (e.g., "Device is in the home, but door was opened so user may have abandoned it.") to the first responder, and allow the first responder to take that into account when responding to the alarm. The monitoring and reporting may continue even after the alarm has been triggered, and after the initial message has been sent. For example, if the user fled the house, and then is able to log into an account from their neighbor's house, the user can send a message updating the alarm to indicate that the user has reached safety. This information can then be passed to the first responders, updating them. If the neighbor was on the user's list of contacts, then when the fire alarm was triggered, the security system may send a message to the neighbor's registered device (e.g., a computer, smartphone, etc.), displaying the message "Your neighbor Joe's fire alarm is tripped.", and also giving the option of an updated response (e.g., "If Joe is with you, please ask him to enter his ID and password.").

Having discussed several examples of the processing that may be performed by a security console and/or a security server in implementing various aspects of the disclosure, some examples of the processing that may be performed by a mobile device in some embodiments will now be discussed with respect to FIG. 7.

Figure 7:
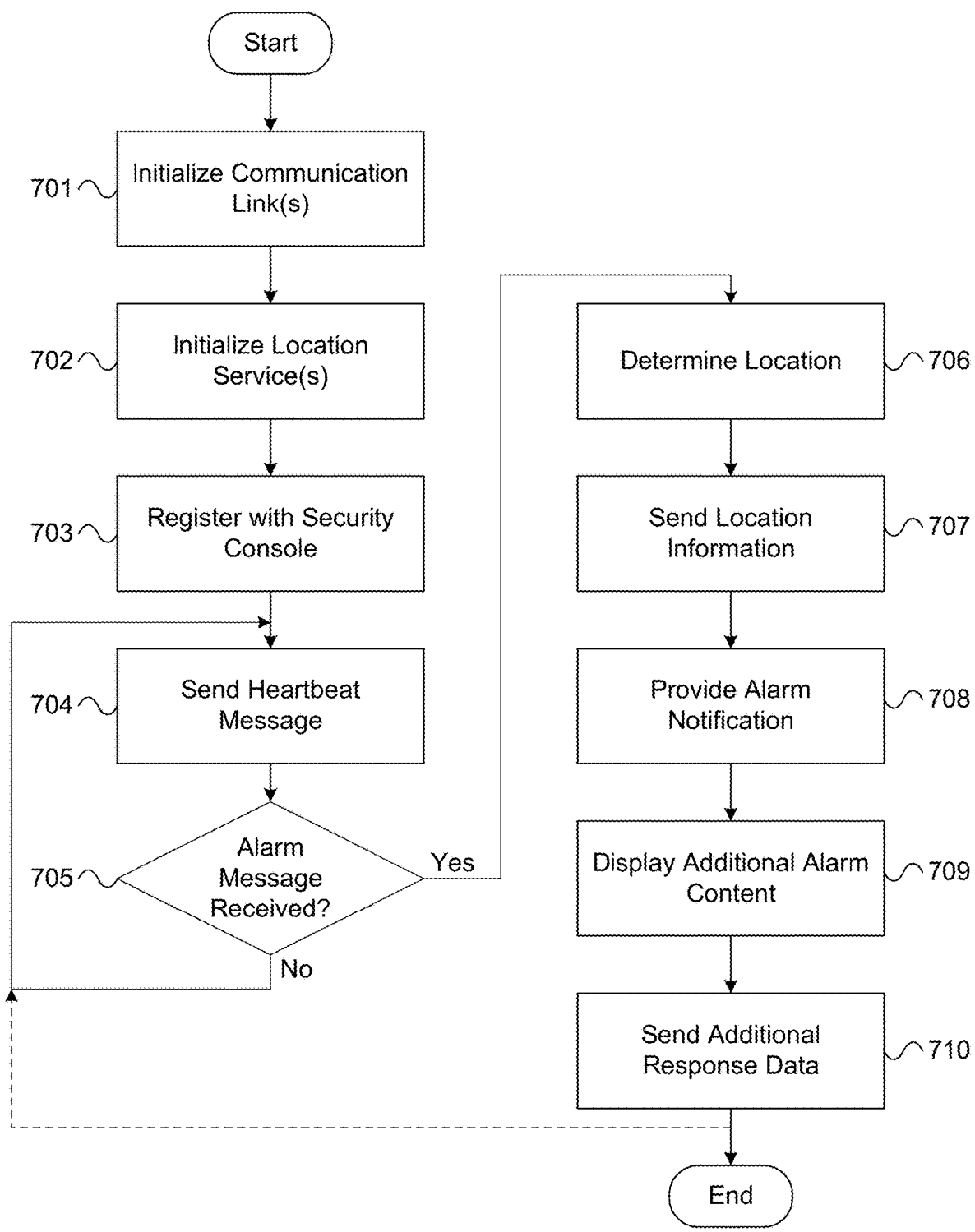
FIG. 7 illustrates a flowchart that depicts an example method of responding to a location request according to one or more illustrative aspects of the disclosure.

FIG. 7 illustrates a flowchart that depicts an example method of responding to a location request according to one or more illustrative aspects of the disclosure. As indicated above, the method illustrated in FIG. 7 can be performed by a mobile device (e.g., a smart phone, a tablet computer, etc.) or any other kind of user device which can be used with the example security system discussed above. The mobile device may, for example, implement one or more aspects of the computing device 200 illustrated in FIG. 2. In some embodiments, one or more steps of the method illustrated in FIG. 7 may additionally or alternatively be performed by a computing device that is communicatively coupled to such a mobile device, such as an assistance server or cloud server which assists the mobile device in performing certain processing functions. As indicated above, while a number of steps are illustrated in the figures (including the steps illustrated in FIG. 7) and discussed below as being performed in a certain order in some embodiments, in other embodiments, these steps may be performed in different orders. In addition, some steps may be combined or might not be performed at all, and/or one or more additional or alternative steps may be performed in addition to or instead of those illustrated in the figures and discussed below.

When it is initially powered on, the particular mobile device that is performing the method illustrated in FIG. 7 may first execute a number of configuration steps. For example, in step 701, the mobile device may initialize one or more communication links. This initialization may, for instance, include initializing one or more cellular interfaces and/or one or more wireless networking interfaces (e.g., IEEE 802.11a/b/g/n interfaces, other WLAN interfaces, etc.), and also may include establishing connections to one or more cellular networks and/or WLAN networks via such interfaces.

In step 702, the mobile device may initialize one or more location services that allow the mobile device to track its location and provide location information to other devices, such as a security console. This initialization may, for example, include initializing one or more satellite positioning services (e.g., GPS services) and/or other positioning services (e.g., WLAN-based positioning). In some instances, the mobile device also may obtain an initial position fix once it initializes its location services so as to enable subsequent location tracking.

In step 703, the mobile device may register with a security console. In registering with the security console, the mobile device may prompt a user to select a detected security console for registration and/or may exchange registration information with the security console, such as a unique identifier associated with the mobile device, a network address assigned to the mobile device, and any other information as may be desired. In some instances, if the mobile device has been previously registered with a security console, then the mobile device might not re-register with the same security console in step 703. Rather, the mobile device may simply send a notification message to the security console to inform the security console that it is once again present and/or online. Such a notification may, in some instances, include updated location information for the mobile device, such as the initial position fix determined in step 702, which can then be used by the security console to track the position of the mobile device. Additionally or alternatively, this location information can be provided by the mobile device to the security console in response to a message (e.g., a ping) received by the mobile device from the security console.

After performing one or more of these configuration steps, the mobile device may enter a standby loop in which it periodically sends a heartbeat message to the security console (e.g., in step 704) and determines whether an alarm message has been received from the security console (e.g., in step 705). In some instances, the heartbeat message may include location information that describes the current location of the mobile device, which may, for example, enable the security console to track changes in position of the mobile device. Additionally or alternatively, the mobile device may send the heartbeat message to the security console in response to a heartbeat message received by the mobile device from the security console. For example, in some instances, the mobile device may send a message that includes such location information in response to a polling request sent by the security console. In these instances, the security console may be configured to periodically poll the mobile device (and/or other registered mobile devices) in order to obtain and track location information associated with the mobile device(s).

If it is determined during this standby loop that an alarm message has been received from the security console, then the mobile device may perform a series of steps to provide its current location to the security console (e.g., so as to enable the processing at the security console discussed above) and to provide the user of the mobile device with additional control over the alarm. In some instances, such an alarm message may be received as one or more text messages (e.g., an SMS message, an MMS message, etc.), instant messages, and/or push notifications. Additionally or alternatively, while such an alarm message that initially notifies the mobile device of an alarm at the premises may be received as one of these types of messages, additional data (e.g., data received from the security console after the initial alarm message) may be received via a generic IP connection (which may, e.g., be established with the security console by the mobile device in response to receiving an initial alarm message).

For example, in step 706, the mobile device may determine its current location. In determining its location, the mobile device may, for instance, analyze satellite positioning signals (e.g., GPS signals) which it has received and/or other signals (e.g., cellular signals, WLAN signals, etc.) which it may have received. Based on these signals, the mobile device may be able to calculate or otherwise determine its current position (e.g., in geographic coordinates, such as latitude and longitude).

In step 707, the mobile device may send location information to the security console. This location information may represent the position of the mobile device determined in step 706 and may, for example, be expressed in terms of geographic coordinates. Additionally or alternatively, the location information may include a set of coordinates, with timing information, that models the mobile device's movement over a predetermined amount of time (e.g., a period of time, such as 60 seconds, leading up to the alarm message being received).

In step 708, the mobile device may notify the user of the alarm. In notifying the user of the alarm, the mobile device may, for example, play an audio alert and/or display a dialog box or prompt. In some instances, such a prompt may be configured to allow the user to cancel the alarm by clicking on a button or providing other input in response to the prompt.

In step 709, the mobile device may display additional alarm content, such as images, audio, and/or live video from the premises (e.g., captured by the security system at the premises). In some instances, this additional alarm content may be included in the prompt provided in step 708, while in other instances, the additional alarm content may be displayed by the mobile device in response to receiving a user request for more information about the alarm. By providing this additional alarm content to the user, the mobile device may be able to assist the user in deciding whether to manually cancel the alarm (e.g., using the prompt provided in step 708) and/or whether to manually contact the local PSAP to speak with first responders.

In step 710, the mobile device may send additional response data to the security console (e.g., a security console, a security server, another security device, etc.). This additional response data may, for instance, include information indicating whether the user has requested to manually deactivate the alarm (e.g., using the prompt provided in step 708) and/or any other information as may be desired. Thereafter, the mobile device may return to the standby loop discussed above (e.g., to periodically send a heartbeat message in step 704 and to determine whether an alarm message has been received in step 705). Alternatively, the method may end.

In addition to allowing a user to manually deactivate an alarm that has been tripped and remotely control other aspects of a security system, the mobile device discussed above also may be configured to provide additional and alternative functionalities in some additional embodiments.

For example, in some instances, in response to providing an alarm notification to a user in step 708, the mobile device may receive input that includes a user request to contact a local PSAP for the premises, and the mobile device may process this input and facilitate this contact. Notably, it is possible that when the mobile device is located away from the premises, the mobile device may be in a region that is served by a different PSAP than the PSAP that serves the premises. As a result, a conventional 911 call by the user of the mobile device might, in these circumstances, not reach the right PSAP, and the user might not be able to discuss the alarm with the first responders who are responding to the alarm at the premises.

In accordance with some embodiments, however, the mobile device may be configured to identify an appropriate PSAP for the premises in response to receiving the user request to contact a PSAP. This identification may, for example, be based on registration information obtained from the security console (e.g., in step 703) that specifies the geographic location of the premises. In addition, after identifying the appropriate PSAP for the premises, the mobile device may initiate a call to the identified PSAP, which may enable the user to speak with the correct first responders.

Many aspects of the disclosure have been described in terms of illustrative embodiments. While illustrative systems and methods have been described which embody various aspects, the scope of the disclosure is not limited to these embodiments. Modifications may, for example, be made, particularly in light of the explanation provided above. For instance, each of the features discussed in the examples above can be utilized alone or in combination or subcombination with elements discussed in other examples. Any of the systems and methods (or parts thereof) may be combined with any other systems, methods, and parts discussed above. Any and/or all of the methods discussed herein can be embodied as computer-executable instructions stored on a computer-readable medium, such as a non-transitory computer-readable memory.

Thus, modifications may be made without departing from the true spirit and scope of the present disclosure. The description should therefore be regarded as illustrative instead of restrictive.

The invention claimed is:

1. A method comprising:
    receiving, by a computing device associated with a security system, an indication of an alarm triggering event at a premises; and
    based on determining that at least one sensor condition, associated with at least one sensor at the premises, is indicative of a legitimate alarm at the premises, sending enhancement data for an alarm, associated with the alarm triggering event, at the premises.

2. The method of claim 1, further comprising selecting, based on a type of the alarm triggering event at the premises, the at least one sensor at the premises.

3. The method of claim 1, further comprising:
    determining, based on the determining that the at least one sensor condition is indicative of a legitimate alarm, a plurality of mobile devices associated with the premises, wherein the sending the enhancement data comprises sending locations of the plurality of mobile devices.

4. The method of claim 1, wherein the sending the enhancement data comprises sending, based on a type of the alarm at the premises and to an emergency service associated with the alarm, at least one of:
    an age of a user associated with the premises;
    a medical condition of a user associated with the premises; or
    a language spoken by a user associated with the premises.

5. The method of claim 1,
    wherein the determining that the at least one sensor condition is indicative of a legitimate alarm comprises determining that the at least one sensor condition is indicative of a user leaving the premises following the alarm, wherein the at least one sensor at the premises comprises at least one of:
    a motion sensor near an exit of a building at the premises;
    a door sensor at the premises; or a location sensor of a mobile device associated with the premises.

6. The method of claim 1, further comprising shortening, based on the determining that the at least one sensor condition is indicative of a legitimate alarm, an abort window for the alarm.

7. The method of claim 1, further comprising selecting, based on the receiving the indication of the alarm triggering event, at least one mobile device, of a plurality of mobile devices associated with the premises, determined to be within a threshold distance of the premises; and
causing output, by the selected at least one mobile device, of an option to confirm the alarm triggering event, wherein the at least one sensor condition comprises information input, via the option, confirming the alarm triggering event.

8. The method of claim 1, further comprising:
based on the determining that the sensor condition is indicative of a legitimate alarm, sending messages, indicating the alarm at the premises, to a plurality of telephone numbers in an order that is based on locations associated with the plurality of telephone numbers.

9. An apparatus comprising:
one or more processors; and
memory storing instructions that, when executed by the one or more processors, configure the apparatus to:
receive an indication of an alarm triggering event at a premises; and
based on determining that at least one sensor condition, associated with at least one sensor at the premises, is indicative of a legitimate alarm at the premises, send enhancement data for an alarm, associated with the alarm triggering event, at the premises.

10. The apparatus of claim 9, wherein the instructions, when executed by the one or more processors, further configure the apparatus to select, based on a type of the alarm triggering event at the premises, the at least one sensor at the premises.

11. The apparatus of claim 9, wherein the instructions, when executed by the one or more processors, further configure the apparatus to determine, based on the determining that the at least one sensor condition is indicative of a legitimate alarm, a plurality of mobile devices associated with the premises, wherein the enhancement data comprises locations of the plurality of mobile devices.

12. The apparatus of claim 9, wherein the instructions, when executed by the one or more processors, configure the apparatus to send the enhancement data by sending, based on a type of the alarm at the premises and to an emergency service associated with the alarm, at least one of:
an age of a user associated with the premises;
a medical condition of a user associated with the premises; or
a language spoken by a user associated with the premises.

13. The apparatus of claim 9, wherein the instructions, when executed by the one or more processors, configure the apparatus to determine that the at least one sensor condition is indicative of a legitimate alarm by determining that the at least one sensor condition is indicative of a user leaving the premises following the alarm, wherein the at least one sensor at the premises comprises at least one of:
a motion sensor near an exit of a building at the premises;
a door sensor at the premises; or
a location sensor of a mobile device associated with the premises.

14. The apparatus of claim 9, wherein the instructions, when executed by the one or more processors, further configure the apparatus to shorten, based on the determining that the at least one sensor condition is indicative of a legitimate alarm, an abort window for the alarm.

15. The apparatus of claim 9, wherein the instructions, when executed by the one or more processors, further configure the apparatus to:
select, based on the receiving the indication of the alarm triggering event, at least one mobile device, of a plurality of mobile devices associated with the premises, determined to be within a threshold distance of the premises; and
cause output, by the selected at least one mobile device, of an option to confirm the alarm triggering event, wherein the at least one sensor condition comprises information input, via the option, confirming the alarm triggering event.

16. The apparatus of claim 9, wherein the instructions, when executed by the one or more processors, further configure the apparatus to, based on the determining that the sensor condition is indicative of a legitimate alarm, send messages, indicating the alarm at the premises, to a plurality of telephone numbers in an order that is based on locations associated with the plurality of telephone numbers.

17. A system comprising:
a computing device; and
at least one sensor at a premises;
wherein the computing device is configured to:
receive an indication of an alarm triggering event at the premises; and
based on determining that at least one sensor condition, associated with the at least one sensor at the premises, is indicative of a legitimate alarm at the premises, send enhancement data for an alarm, associated with the alarm triggering event, at the premises; and
wherein the at least one sensor is configured to output information indicating the at least one sensor condition.

18. The system of claim 17, wherein the computing device is further configured to select, based on a type of the alarm triggering event at the premises, the at least one sensor at the premises.

19. The system of claim 17, wherein the computing device is further configured to determine, based on the determining that the at least one sensor condition is indicative of a legitimate alarm, a plurality of mobile devices associated with the premises, wherein the enhancement data comprises locations of the plurality of mobile devices.

20. The system of claim 17, wherein the computing device is configured to send the enhancement data by sending, based on a type of the alarm at the premises and to an emergency service associated with the alarm, at least one of:
an age of a user associated with the premises;
a medical condition of a user associated with the premises; or
a language spoken by a user associated with the premises.

21. The system of claim 17, wherein the computing device is configured to determine that the at least one sensor condition is indicative of a legitimate alarm by determining that the at least one sensor condition is indicative of a user leaving the premises following the alarm, wherein the at least one sensor at the premises comprises at least one of:
a motion sensor near an exit of a building at the premises;
a door sensor at the premises; or
a location sensor of a mobile device associated with the premises.

22. The system of claim 17, wherein the computing device is further configured to shorten, based on the determining that the at least one sensor condition is indicative of a legitimate alarm, an abort window for the alarm.

23. The system of claim 17, wherein the computing device is further configured to:
- select, based on the receiving the indication of the alarm triggering event, at least one mobile device, of a plurality of mobile devices associated with the premises, determined to be within a threshold distance of the premises; and
- cause output, by the selected at least one mobile device, of an option to confirm the alarm triggering event, wherein the at least one sensor condition comprises information input, via the option, confirming the alarm triggering event.

24. The system of claim 17, wherein the computing device is further configured to, based on the determining that the sensor condition is indicative of a legitimate alarm, send messages, indicating the alarm at the premises, to a plurality of telephone numbers in an order that is based on locations associated with the plurality of telephone numbers.

* * * * *

UNITED STATES PATENT AND TRADEMARK OFFICE
CERTIFICATE OF CORRECTION

| | | |
|---|---|---|
| PATENT NO. | : 11,837,075 B2 | Page 1 of 1 |
| APPLICATION NO. | : 18/151562 | |
| DATED | : December 5, 2023 | |
| INVENTOR(S) | : Poder et al. | |

It is certified that error appears in the above-identified patent and that said Letters Patent is hereby corrected as shown below:

In the Specification

Column 5, Line 6:
Delete "102 a" and insert --102a--

Column 5, Line 17:
Delete "102 a" and insert --102a--

Column 5, Line 24:
Delete "102 a" and insert --102a--

Signed and Sealed this
Twenty-fourth Day of December, 2024

Derrick Brent
*Acting Director of the United States Patent and Trademark Office*